United States Patent [19]
Benck et al.

[11] Patent Number: 5,209,657
[45] Date of Patent: May 11, 1993

[54] DEVICE FOR INJECTING PREHEATED AIR INTO A SHAFT FURNACE AND PROCESS OF MANUFACTURING BALL-AND-SOCKET JOINTS

[75] Inventors: Jean Benck, Dudelange; Pierre Mailliet, Howald, both of Luxembourg

[73] Assignee: Paul Wurth S.A., Luxembourg

[21] Appl. No.: 790,405

[22] Filed: Nov. 8, 1991

[30] Foreign Application Priority Data

Nov. 9, 1990 [LU] Luxembourg .................. 87383

[51] Int. Cl.[5] ................. F23L 5/00; F27D 1/08
[52] U.S. Cl. ........................ 432/99; 110/182.5
[58] Field of Search ............. 432/95, 96, 99, 102; 122/6.5; 110/182.5

[56] References Cited
U.S. PATENT DOCUMENTS

| | | |
|---|---|---|
| 3,662,696 | 5/1972 | Mahr et al. .............. 110/182.5 |
| 3,766,868 | 10/1973 | Mahr ...................... 110/182.5 |
| 4,027,605 | 6/1977 | Legille .................. 110/182.5 |
| 4,940,005 | 7/1990 | Selvi ......................... 432/99 |
| 4,987,838 | 1/1991 | Mailliot et al. ........... 110/182.5 |
| 5,119,743 | 6/1992 | Mailliet et al. .......... 110/182.5 |

Primary Examiner—Henry C. Yuen
Attorney, Agent, or Firm—Fishman, Dionne & Cantor

[57] ABSTRACT

A device is presented for injecting preheated air into a shaft furnace and comprises of a plurality of tubular elements provided with a refractory lining, which are connected to each other by a ball-and-socket articulation and an expansion joint. The ball-and-socket articulations comprise a convex ball portion formed in the refractory material of the adjacent segment. They comprise a protective shell made of refractory steel which extends around the convex part up to the base of the ball portion. The radius of curvature of each ball-and-socket articulation is in the range of magnitude of half the diameter of the tubular elements.

12 Claims, 15 Drawing Sheets

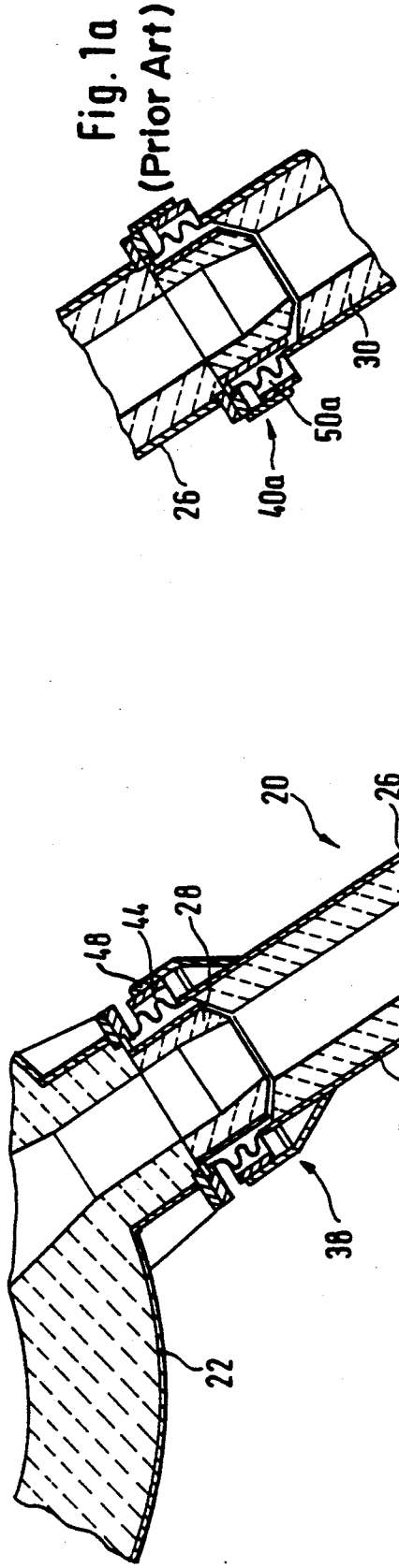
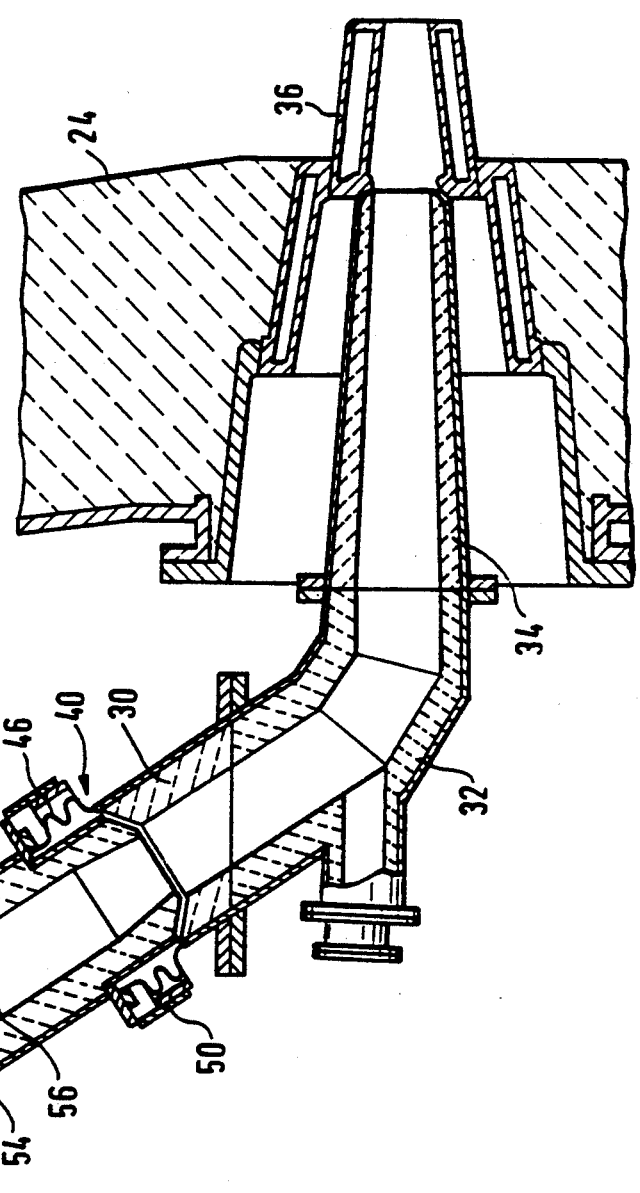
Fig. 1a (Prior Art)
Fig. 1 (Prior Art)

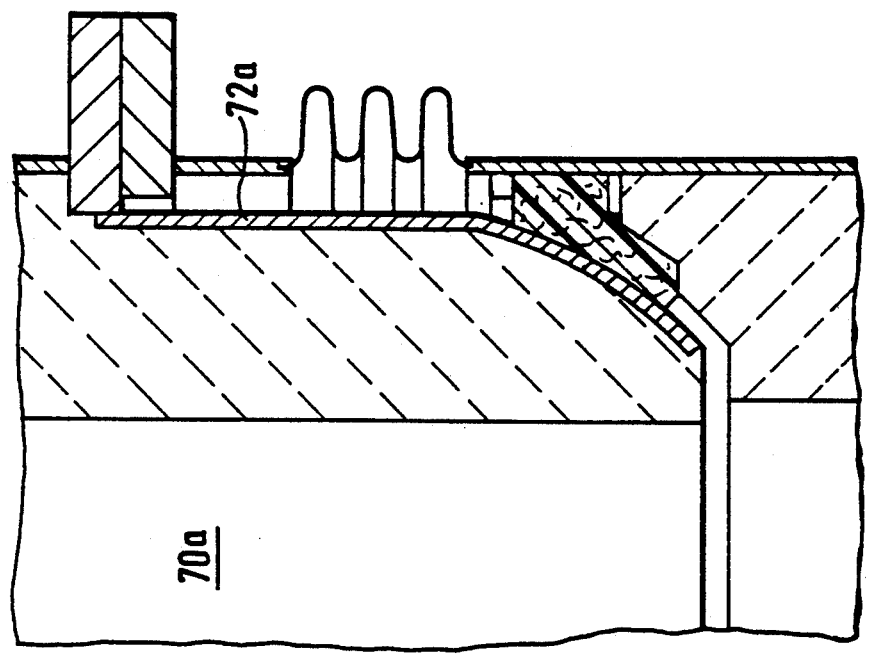
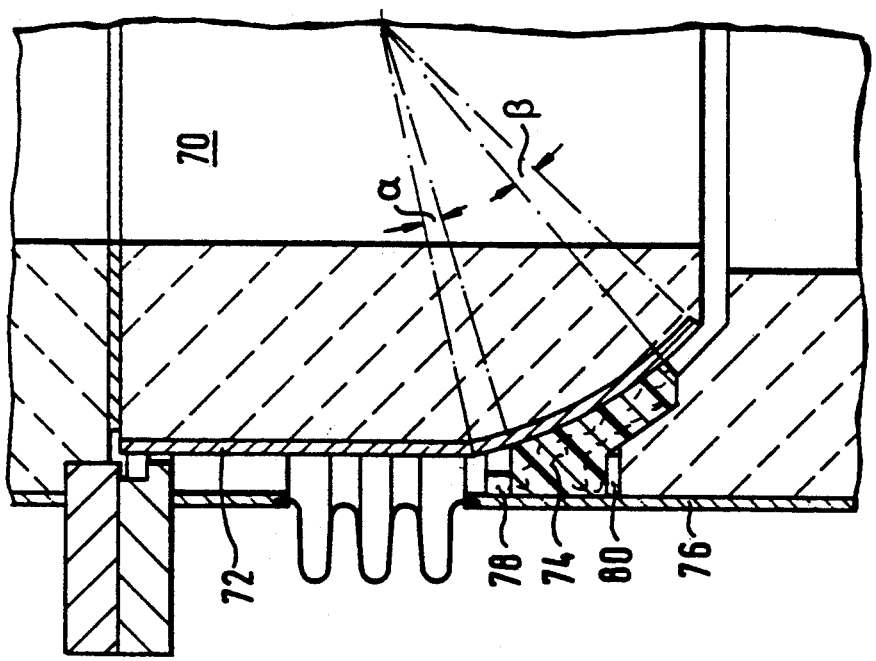

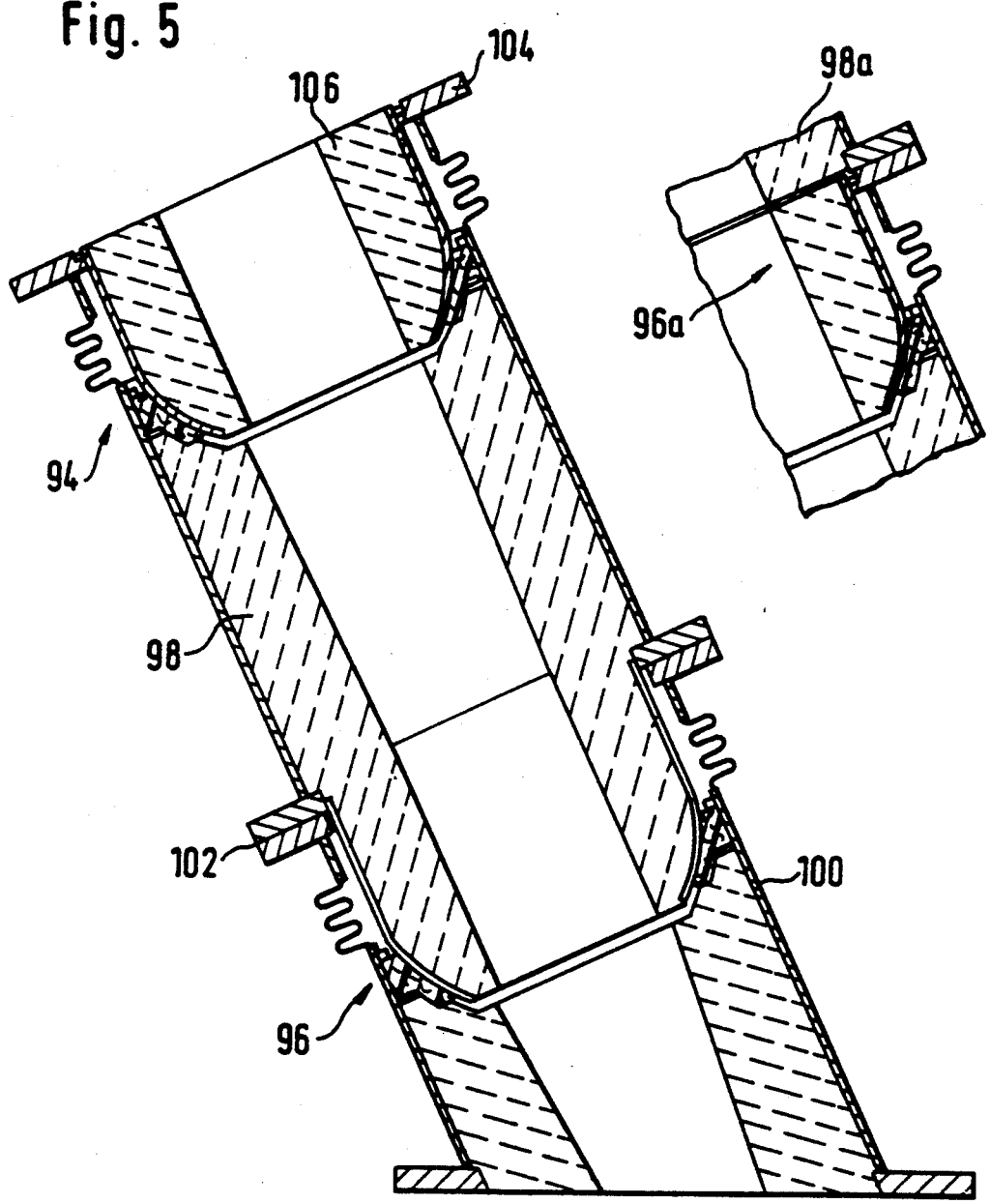

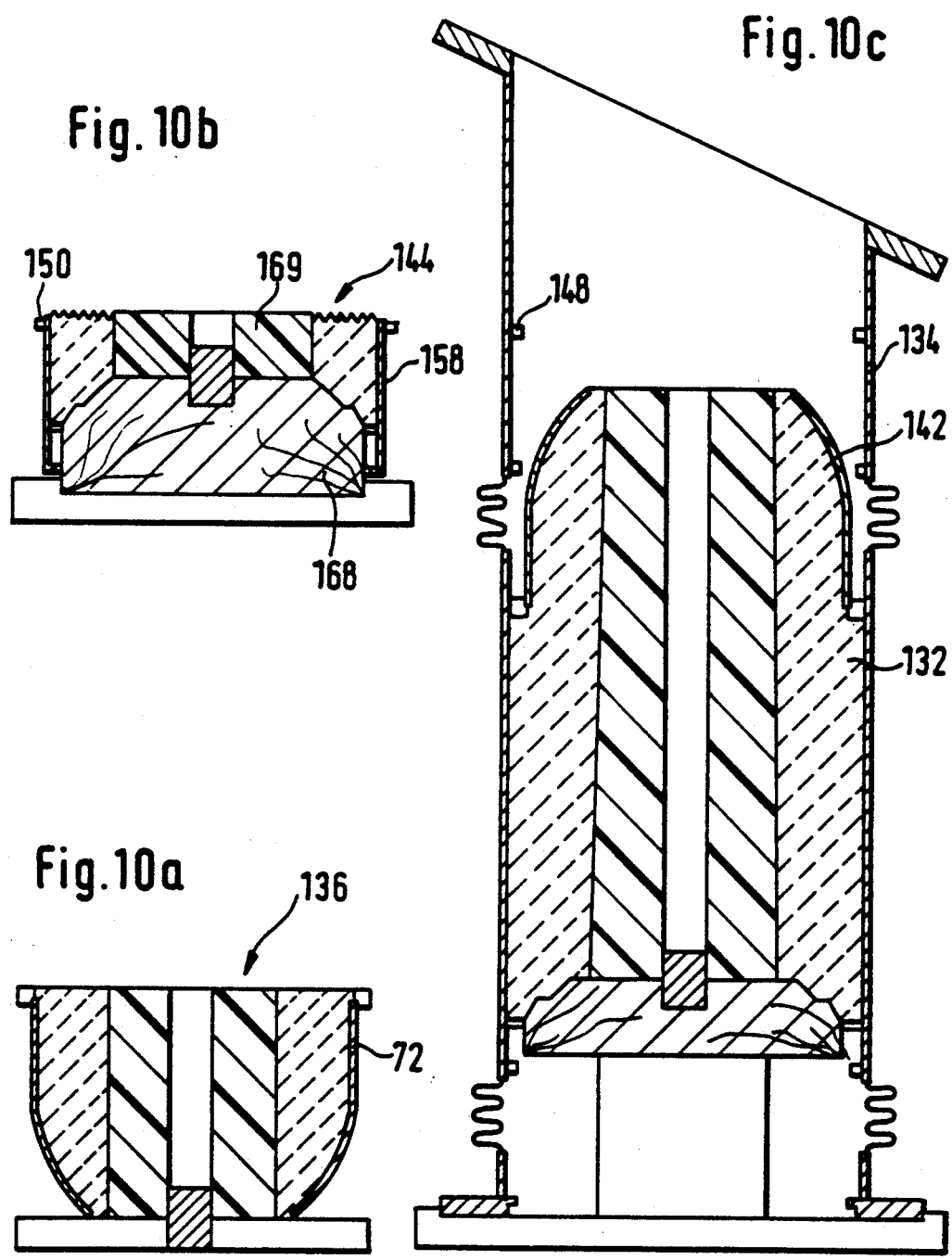

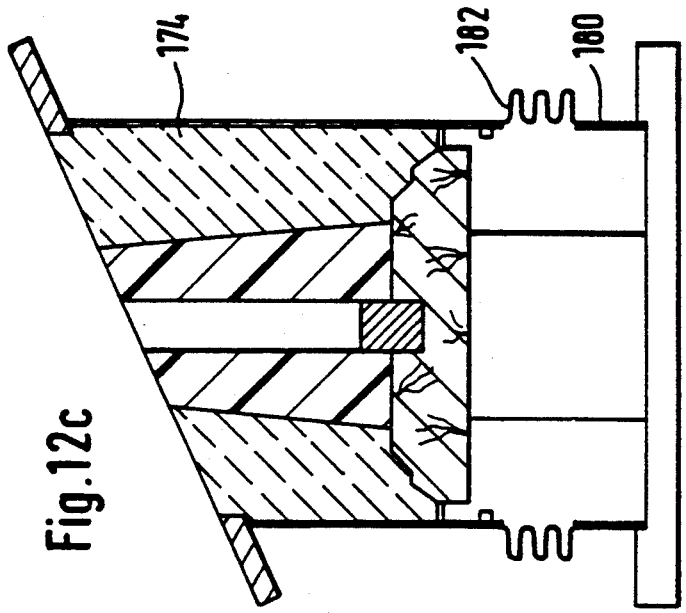
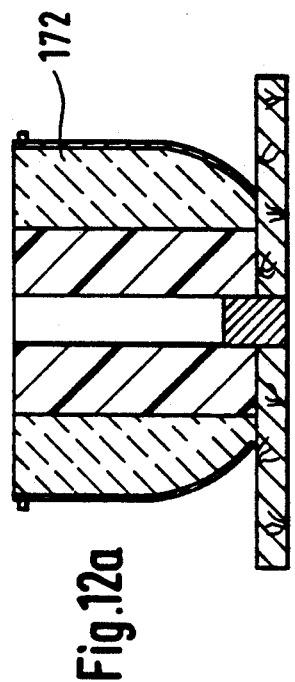
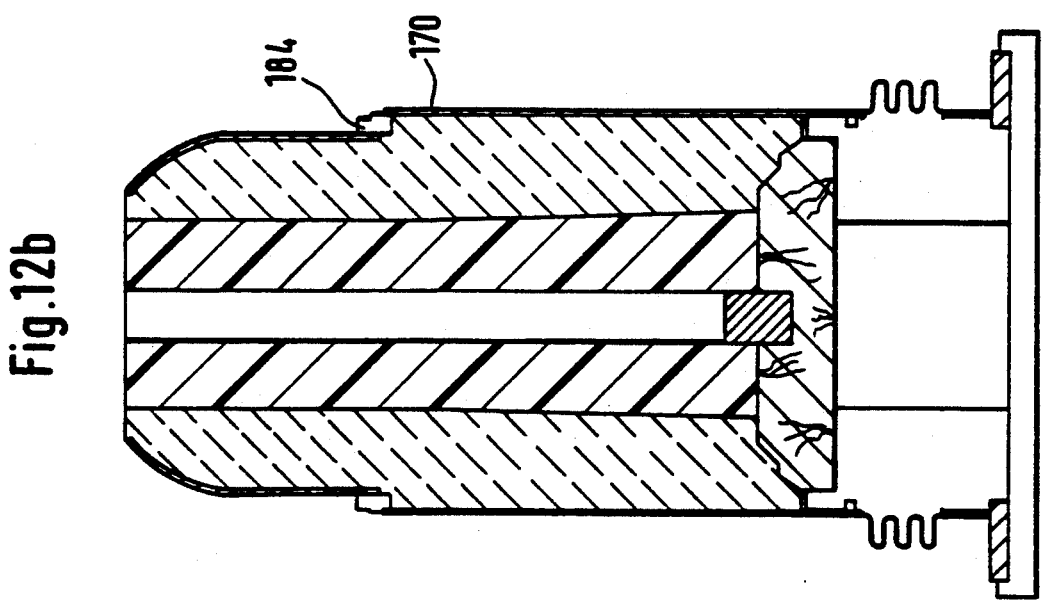
Fig.12c
Fig.12a
Fig.12b

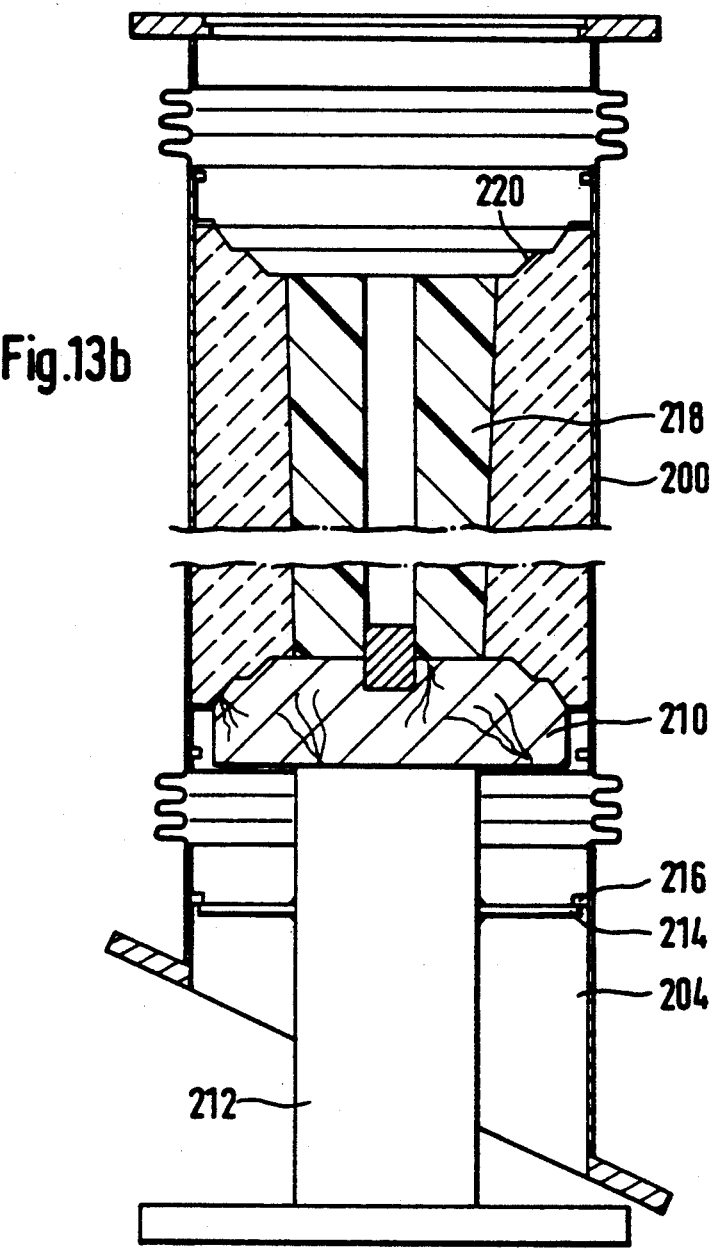

DEVICE FOR INJECTING PREHEATED AIR INTO A SHAFT FURNACE AND PROCESS OF MANUFACTURING BALL-AND-SOCKET JOINTS

TECHNICAL FIELD

The present invention relates to a device for injecting preheated air into a shaft furnace.

BACKGROUND OF THE INVENTION

Devices for injecting preheated air in a shaft furnace, more generally known under the name "tuyere-stock", are subject to problems of mobility and sealing. In fact, as a result of the high temperature of the preheated air (a temperature on the order of 1200° C. or more) and of the high temperature prevailing inside the furnace, the wall of the latter and the bustle pipe and the tuyere-stock are subject to thermal expansions and deformations which cause significant relative displacements between the bustle pipe and the wall of the furnace. The tuyere-stock must therefore be capable of compensating for these relative displacements, while at the same time preventing leaks of gas or preheated air.

To meet these requirements, U.S. Pat. No. 3,766,868 discloses a tuyere-stock of the type employing separate cylindrical members with an intermediate member being connected to the end members by means of articulated joints comprised of cardan compensators. This tuyere-stock has since been improved by the design of universal ball-and-socket joints like those described in German patent specification DE-C2-2218331. The three joints of this tuyere-stock make it possible to compensate all the relative movements between the bustle pipe and the wall of the furnace. Sealing in the region of the joints is obtained by means of bellows expansion joints, while mechanical stability is ensured by means of cardan connections associated with the two opposite ends of the central tubular element in the region of the two universal joints.

It will be appreciated that the most stressed and most critical part of the tuyere-stock is always located in the place of the joints. In fact, the mobility of the ball portion with respect to its socket often leans to irreversible distortions of the soft joints and to frictions among refractory materials. In addition, given the difficulties of machining refractory steel, it is not possible to extend the amouring, forming the casing of reason why microcracks are often formed in the refractory of the tip of the ball portion, causing disturbing circulations and whirls.

In addition to these quality criteria for a reliable tuyere-stock are added the concern for a competitive manufacturing price, for the possibility of easy and rapid dismounting, for the possibility to easily renew or replace the refractory material if necessary, etc. It will be appreciated that all those criteria often tend to oppose each other, thus forcing the designer and manufacturer to choose a reasonable compromise.

SUMMARY OF THE INVENTION

The above-discussed and other problems and deficiencies of the prior art are overcome or alleviated by the improved tuyere-stock of the present invention. The device of the present invention includes a plurality of separate cylindrical elements, each comprising an external steel casing and an internal refractory lining and includes at least one central tubular element connector, on one side, by a first ball-and-socket articulation and a first expansion joint to an upper connection piece integral with a preheated air feeding bustle pipe surrounding the furnace and, on the other or opposite side, by a second ball-and-socket articulation and a second expansion joint to a lower connection piece extended by an elbow and a blast nozzle, the latter being articulated on a tuyere installed in the wall of the furnace. The ball-and-socket joints each comprise a convex ball portion formed by the end of one of the connection segments and pivoting in a concave socket-portion formed by the end of the adjacent connection segment and a soft refractory joint interposed therebetween.

The present invention is more wear resistant at the location of the joints, which owing to its numerous alternative solutions, adapts itself perfectly to the requirements of the user, while permitting a reasonable manufacturing price.

In order to achieve this wear resistance, the device according to the present invention includes a radius of curvature for each ball-and-socket joint on an order of magnitude of half the diameter of the different connection elements. In addition, the convex ball portions of the ball-and-socket joints comprise a protective sheath or sleeve made of refractory steel which extends to the diametrical base of the ball portion. The reduction of the radius of curvature of the ball-and-socket joints allows a better guiding of the ball portions in their sockets, while reducing the risks of shock and wear of the soft joints by constantly maintaining the same width for a joint.

The reduction of the radius of curvature of the joints and the fact that the metallic amouring or casing, which at this location, forms the sheath of the ball and extends to the base of the latter, and allows the maintenance of a uniform width for the joint slot or groove during the pivoting movements.

The present invention also provides a new process for manufacturing a convex ball portion or ball-and-socket joints of a device for injecting preheated air into a shaft furnace. This process includes first fabricating the ball sheath or sleeve of refractory steel and providing it with an inner refractory lining with the end of a refractory steel pipe being distorted until it has the form of a convex dome with a central opening and a convex spherical surface extending between the central opening and the cylindrical surface of the pipe. The sheath thus formed is placed on a support. A cylinder having a diameter slightly inferior to the diameter of the central opening is placed axially inside and the refractory material is cast between the cylinder and the sheath by using the latter as a mold.

According to a first embodiment of a tuyere-stock according to the present invention, the ball portions are formed by the lower ends of the upper connection element and of the central tubular element.

The ball portion of the central tubular element can either be in integral part of this element, or can be separated from the latter by a transverse junction filled with an annular joint.

The amouring of the central tubular element and the one of the lower connection pipe can be connected directly to each other through an expansion joint, or by means of a flange or a detachable weld.

The socket of the lower joint can be formed into the refractory lining cast in a cylindrical sheath made of refractory steel and arranged coaxially inside the amouring of the lower connection piece.

The soft refractory joint can be fixed partially to the amouring and partially to the rim of the socket. It can also be partially fixed to an inner seat of the cylindrical sheath and partially to the refractory material. Alternatively, it can also be attached partially to the refractory material and partially to a seat delimited by the upper part of the sheath and by a ring welded inside the amouring.

In accordance with a second embodiment of the present invention, the sockets of both ball-and-socket joints are arranged at the two opposite ends of the central tubular element, while the convex ball portions are arranged in the upper and lower connection pieces.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several figures:

FIG. 1 shows a view, in vertical section, of a conventional tuyere-stock according to U.S. Pat. No. 3,766,867;

FIG. 1a shows an alternative embodiment of the lower joint of the tuyere-stock according to FIG. 1;

FIGS. 3 and 3a illustrate in juxtaposition and in axial section a ball-and-socket joint according to the present invention;

FIG. 5 shows diagrammatically an axial section through the first vertical section of a first embodiment of a tuyere-stock according to the present invention;

FIG. 5a illustrates schematically an alternate execution of the lower joint of the tuyere-stock according to FIG. 5;

FIGS. 10a, 10b and 10c illustrate schematically the different manufacturing steps for the refractory lining of the different elements of the tuyere-stock depicted is FIG. 7;

FIGS. 12a, 12b and 12c illustrate schematically the different manufacturing steps for the refractory lining of the tuyere-stock depicted in FIG. 11;

FIGS. 13a, 13b and 13c illustrate schematically the different manufacturing steps for the refractory lining of the tuyere-stock depicted in FIG. 13.

DETAILED DESCRIPTION OF THE PREFERRED EMBODIMENT

Figure 2:
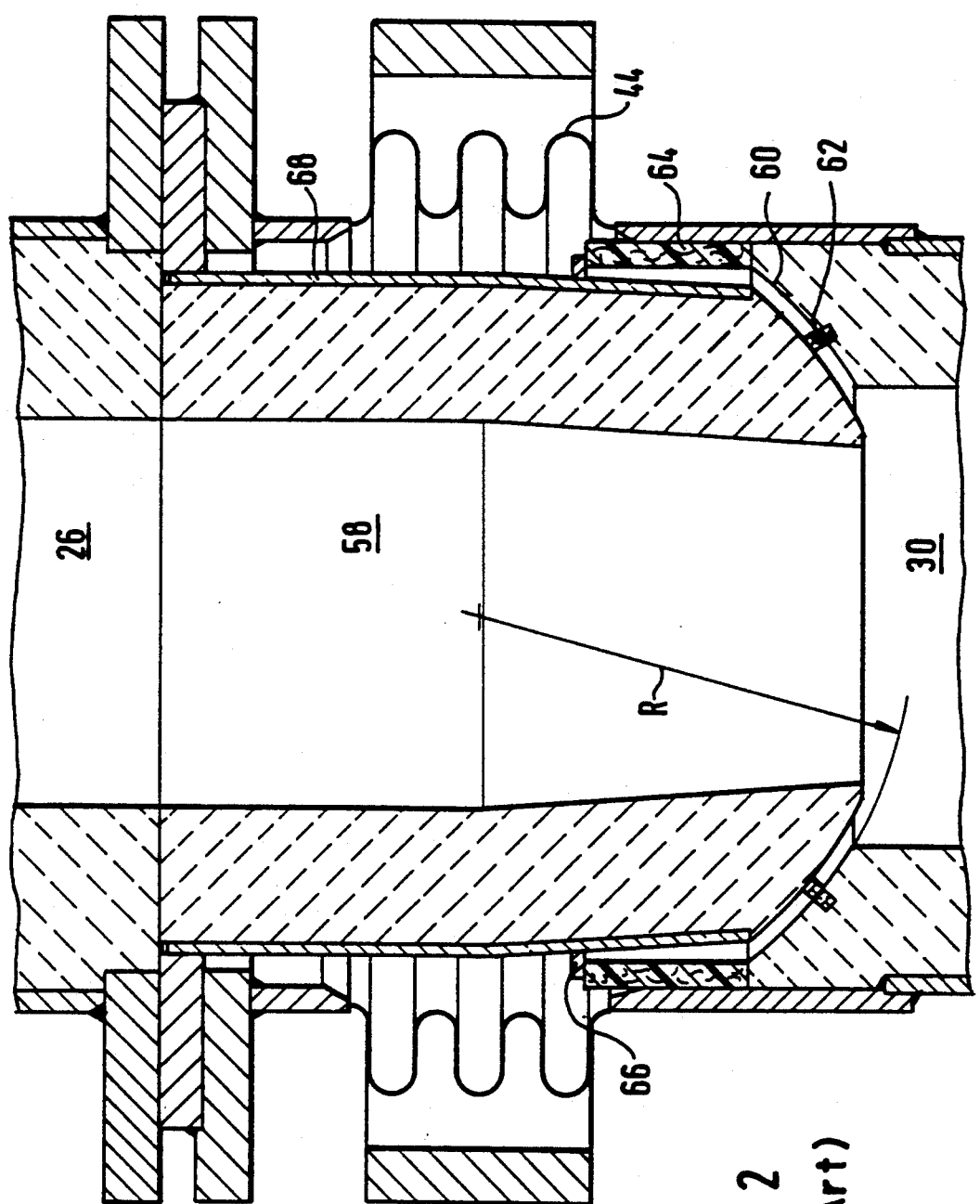
FIG. 2 shows the details of a joint of a tuyere-stock as disclosed in German Pat. No. DE-C2-2218331.

The known tuyere-stock, designated by the reference 20 in FIG. 1, connects a main bustle pipe 22, arranged around a blast furnace, to the wall 24 of the blast furnace. This tuyere-stock 20 comprises a straight oblique section consisting of a central tubular element 26 articulated with its upper end on a connection piece 28 fixed to the bustle pipe 22 and at its lower end on a connection piece 30 flanged to an elbow 32. This elbow 32 is extended by a nozzle 34, the end of which is articulated on a tuyere 36 fastened in the wall 24 of the furnace. The upper joints 38 and lower joints 40 between the central tubular element 26 and the two connection pieces 28 and 30 are universal points allowing relative shifts or movement between the bustle pipe 22 and the wall of the furnace 24. Sealing in the region of the joints 38 and 40 is obtained by means of bellows expansion joints 44, 46 fixed respectively to the tubular element 26 and the adjacent connection pieces 28 and 30. Mechanical stability is ensured by means of cardan joints 48, 50 likewise connecting the central element 26 to the adjacent connection pieces 28 and 30. All these elements of the tuyere-stock consist of an outer-metal amouring or housing 52 provided with an inner refractory lining 54, through which passes a supply channel or conduit 56 ensuring the passage of the preheated air.

Each one of the two joints 38, 40 consists of a convex part or portion called a ball and of a concave part or portion called a socket. In the upper joint 38, the ball is part of the upper connection piece 28 and penetrates into the socket formed by the upper end of the central element 26. The lower part of the latter constitutes the ball portion of joint 40 and penetrates into the socket formed by the upper part of the lower connection piece 40.

In the embodiment of FIG. 1, the ball portion of the joint 40 is integral with the central element 26, that is, its refractory lining extends, without interruption, from the upper end to the tip of the ball portion. This design of the central element 26 makes its manufacture easier, compared with the alternative solution illustrated in FIG. 1a, where the ball portion is separated from the rest of the central element and is connected to the later in the region of the flange, which is provided for the fastening of the cardan 50a. The alternative solution illustrated on FIG. 1a presents however the advantage of allowing the separate dismounting of the lower part, which consists of the tubular connection piece 30 and the joint 40a, from the upper part consisting of the rest of the central element 26 and the upper joint 38 with the tubular connection Piece 28. It shall be noted that the upper joint 38 must necessarily be constructed as shown in FIG. 1a, so that the tuyere-stock can be disconnected from the bustle pipe 22.

FIG. 2 shows a known embodiment of a joint connection as disclosed in the German patent DE-C2-2218331. This embodiment is essentially different from that one depicted in FIG. 1 in that the joints are spherical, as shown by the joint between the ball part 58 and the socket of the connection piece 30. In this embodiment, the ball portion 58 is also separated from the central element 26, following the example of FIG. 1a. The embodiment of the ball-and-socket joint. A first sealing ring 62 here.

Another difference as compared with the embodiment of FIG. 1 is the arrangement of soft resilient joints in the region of the ball-and-socket joint. A first sealing ring 62 consisting, e.g. of ceramic fibers is incorporated in the the socket 60 and the tip of the ball portion 58. Another soft seal 64, also made of ceramic fibers, is arranged in the annular space between the lower end of the metallic sheath 68 of the ball portion 58 and the cylindrical connection sleeve of the expansion joint 44. This seal 64 is wedged between the edge of the socket 60 and a peripheral collar 66 welded to the sheath 68.

The purpose of these joints 62 and 64 is essentially to stop or to reduce the penetration of hot air inside the expansion joints 44 in order to provide them a better protection against high temperatures. When the ball portion 58 is subjected to an axial shift relative to the connection piece 30, the lower edge of the sheath 68 may distort or even crush the seal 64 on one side, whereas on the opposite side, the collar 66 tends to compress the seal 64 in the axial direction. Given that the refractory joints are lacking elasticity, there is a risk that these shifts cause irreversible distortions, thus reducing their efficiency.

The device according to FIG. 2 shows another handicap, in so far as the refractory-steel sheath 68 is only extending to the limit of the cylindrical part of the ball portion 58. The refractory tip of the ball portion 58 is, therefore, rapidly overladen with microcracks which are at the origin of a rapid wear and a breaking of the tip of the ball portion. The lack of support for the refractory of the tip of the ball portion 58 needs, furthermore, a relatively large radius of curvature R to avoid that the convex tip, which is not supported by the sheath 68, has been tapered too much. This, on its turn, is at the origin of the sharp edge between the cylindrical part and the convex part of the ball portion 58, and which risks to crush the seal 64 during the angular movements of the articulation.

FIGS. 3 and 3a each show one half of an articulation according to the present invention, the FIGS. being shown close to each other, so as to show an entire joint, of which the left part shows the version with the ball portion separated from the central conduit segment and of which the right part shows the ball portion of the central conduit segment.

The FIGS. 3 and 3a show that the ball portion of the articulation according to the present invention with items 70, 70a being completely enveloped by its refractory-steel sheath, and items 72, 72a extending to the base of the ball portion around its convex section. The manufacture of such a refractory sheath 72, 72a, in a single piece with a convex section is rendered possible by a novel manufacturing process, explained more fully in detail hereinafter. Compared to the state of the art exemplified in FIG. 2, the ball portion of the present invention has a less important radius of curvature, in the order of magnitude of half a diameter of the connection conduit segments of the tuyere-stock, which improves its mobility. A seal 74, for example made of ceramic fibers, is provided between the ball portion 70, 70a and the refractory of the tubular connection piece 76. This seal can, for example, be cemented to the amouring of the tubular connection piece 76 between two support rings 78, 80. Seal 74 adapts perfectly to the shape of the tip of the ball portion and extends to the major part of the convex section of the latter. In case the tuyere-stock is designed to accommodate to a maximum axial misalignment of 7°, the ball portion 72, 71 can deviate 3,5° on both sides from its neutral position illustrated on the FIGS. 3 and 3a by the angles $\alpha$ and $\beta$. During such an extreme pivoting movement, the seal 74 always forms a thick sealing pad or cushion without being compressed by the ball portion 70, 70a, owing to the fact that the width of the slot or gap remains constant during the relative swiveling.

Figure 4:
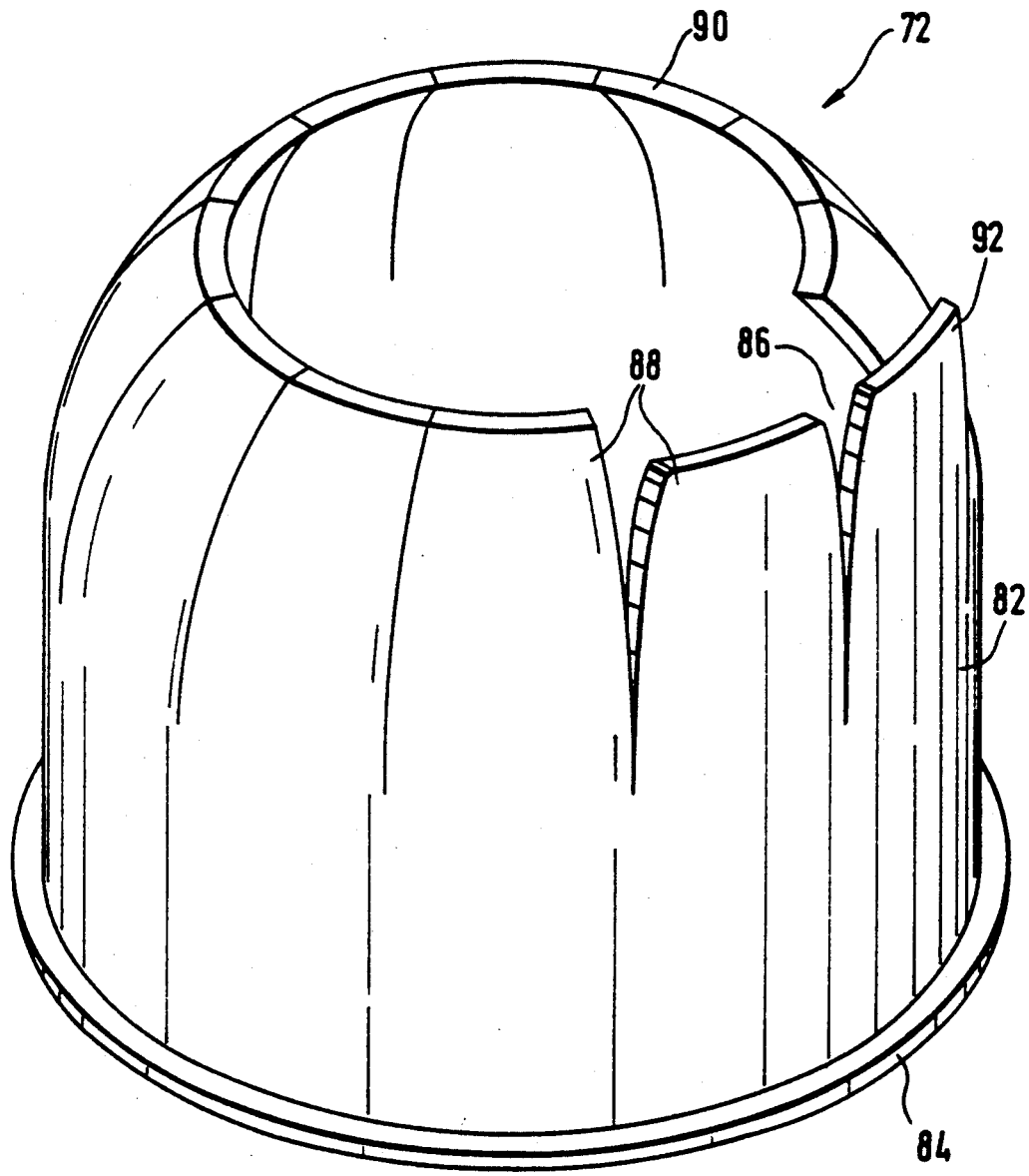
FIG. 4 illustrates schematically the process for making a sheath of refractory steel, for a ball portion of a joint connection according to the present invention.

With reference to FIG. 4, the process according to the present invention for making the refractory-steel sheath of a ball portion, will now be described. To this effect, a cylindrical pipe 82 made of refractory steel is used, which might be provided with a small peripheral flange 84, in the case of the embodiment shown in FIG. 3. All around the opposite side of the flange 84, at regular distances, cuttings following the generating line are made, with a depth corresponding to the length of the convex section of the ball portion to be made. These cuttings 86 thus define identical tongues 88. Tongues 88 are then folded towards the axis of the pipe 82 until the cuttings 86 are completely closed, in order to define a spherical dome with a central opening 90 formed by the frontal bevels 92 of the tongues 88 juxtaposed to each other. This crimping of the tongues 88 can be carried out in a mold with a spherical bottom. The sheath 72 is then finished by welding the different tongues 88 one to the other over the whole length of the cuttings.

FIG. 5 illustrates a first embodiment of the oblique section of a tuyere-stock with two identical ball-and-socket joints 94 and 96, each of which comprising a ball portion enveloped by a sheath made of refractory steel manufactured according to the process described with reference to FIG. 4. FIG. 5 as well as the following FIGS. do not show, for reasons of simplicity, the means for obtaining mechanical stability to the joints 94 and 96. These means, although present in a specific embodiment, can be means known per se, like cardan-joints or tension rods as disclosed in the European Patent EP-A1-0363576.

FIG. 5a shows an alternative embodiment already described hereinbefore, according to which the ball portion of the lower joint 96a is separated from the central tubular conduit element 98a.

In both the embodiments of FIGS. 5 and 5a, the sealed connection between the central element 98 and the lower tubular connection piece 100 is performed by means of a flange 102 at the upper end of the sheath of the ball portion. The central element 98 also comprises an upper flange 104 beyond the expansion joint of the upper articulation 94 to connect the tuyere-stock to the bustle pipe (not shown).

In the embodiment of FIG. 5, these flanges 102 and 104 are, moreover, necessary for manufacturing the three elements separately, namely the central element 98, the lower connection piece 100 and the upper connection piece 106, which consist simply of the ball portion of the ball-and-socket joint 94. This manufacturing will now be described and illustrated with reference to FIGS. 6a, 6b and 6c.

Figure 6B:
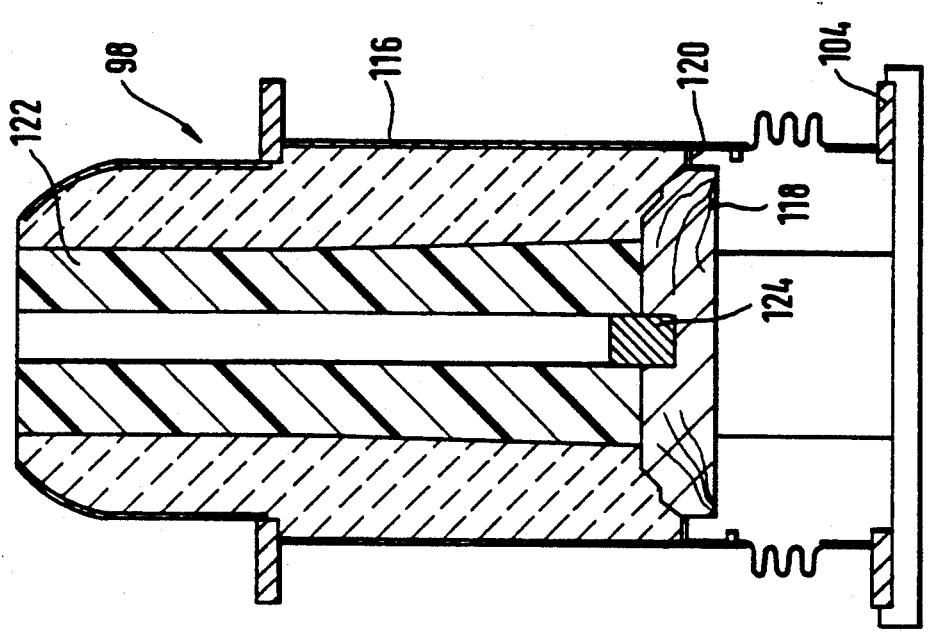
FIGS. 6a, 6b and 6c illustrate schematically the different manufacturing steps for the refractory lining of the different elements of the tuyere-stock depicted in FIG. 5.
Figure 6C:
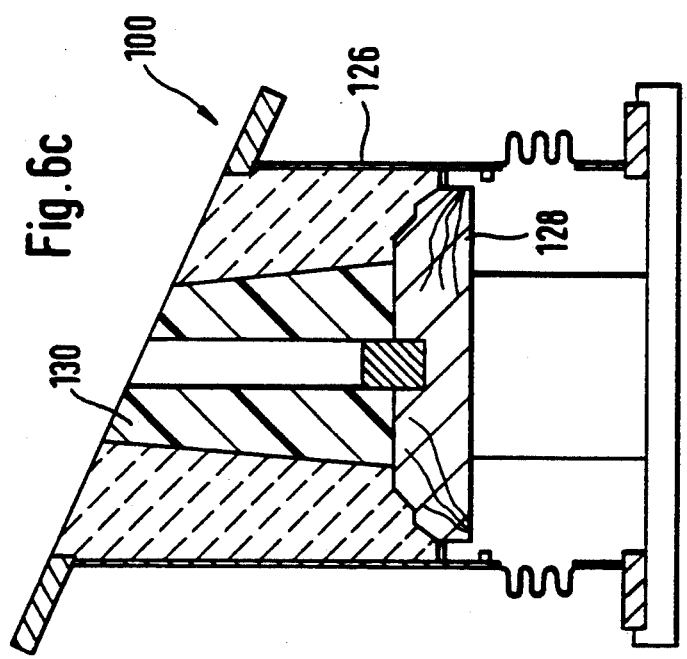
Figure 6A:
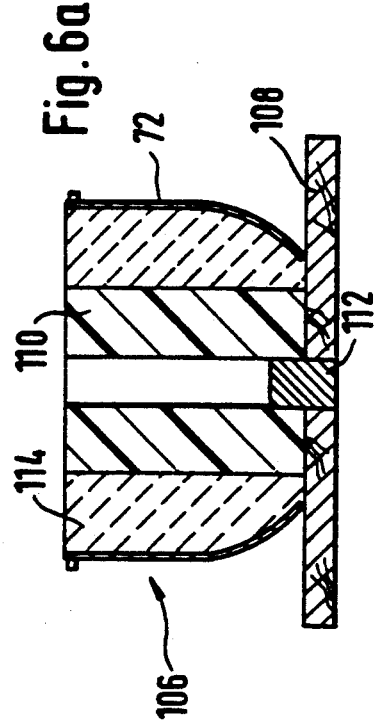

FIG. 6a shows the manufacturing of the refractory of the ball portion 106. For this purpose, the sheath 72 manufactured according to the process described with references to FIG. 4, is overturned onto a support 108, made for example of wood, the central opening 90, preferably directed downwardly. A cylindrical form 110, made e.g. of expanded synthetic material, is then introduced into the sheath 72 and held in place, e.g by a plug 112 fastened to the support 108 and penetrating into an axial channel of the form 110. The only thing that remains to be done is casting the refractory material 114 into the annular space delimited by the form 110 and the sheath 72, by using the latter as a mold.

FIG. 6b shows the manufacturing of the central conduit element 98. For this purpose, the assembly formed by the amouring 116 of the central element with the sheath of the lower ball portion and the upper expansion joint is overturned, the flange 104 to the bottom, onto a support 118; the ring 120 which delimits the placement o the joint of the upper articular 94 closing the opening around the support. The upper profile of the support 118 is complementary to the form of the socket of the articulation 94. Thereupon a cylindrical form 122 made of expanded synthetic material is axially placed onto the support 118, and held in place by a plug 124. The only thing that remains to be done is to fill the annular space around the form 122 with refractory material.

FIG. 6c shows the manufacturing of the lower connection piece. As in the case of FIG. 6b, the amouring 126 of this tubular connection piece, including the expansion joint of the lower articulation, is overturned, the upper flange to the bottom, onto a support 128 identical to the support 118 used previously. Then a form made of expanded synthetic material 130, of which the outer form corresponds to the inner channel of the finished tubular connection piece 100, is placed axially onto the support 128, and the space around the form 130 is filled with refractory material. It will be appreciated that the three forms made of synthetic material 100, 122 and 130 may remain in place when assembling the tuyere-stock, since they will be consumed automatically when the tuyere-stock is put into operation.

Figure 7:
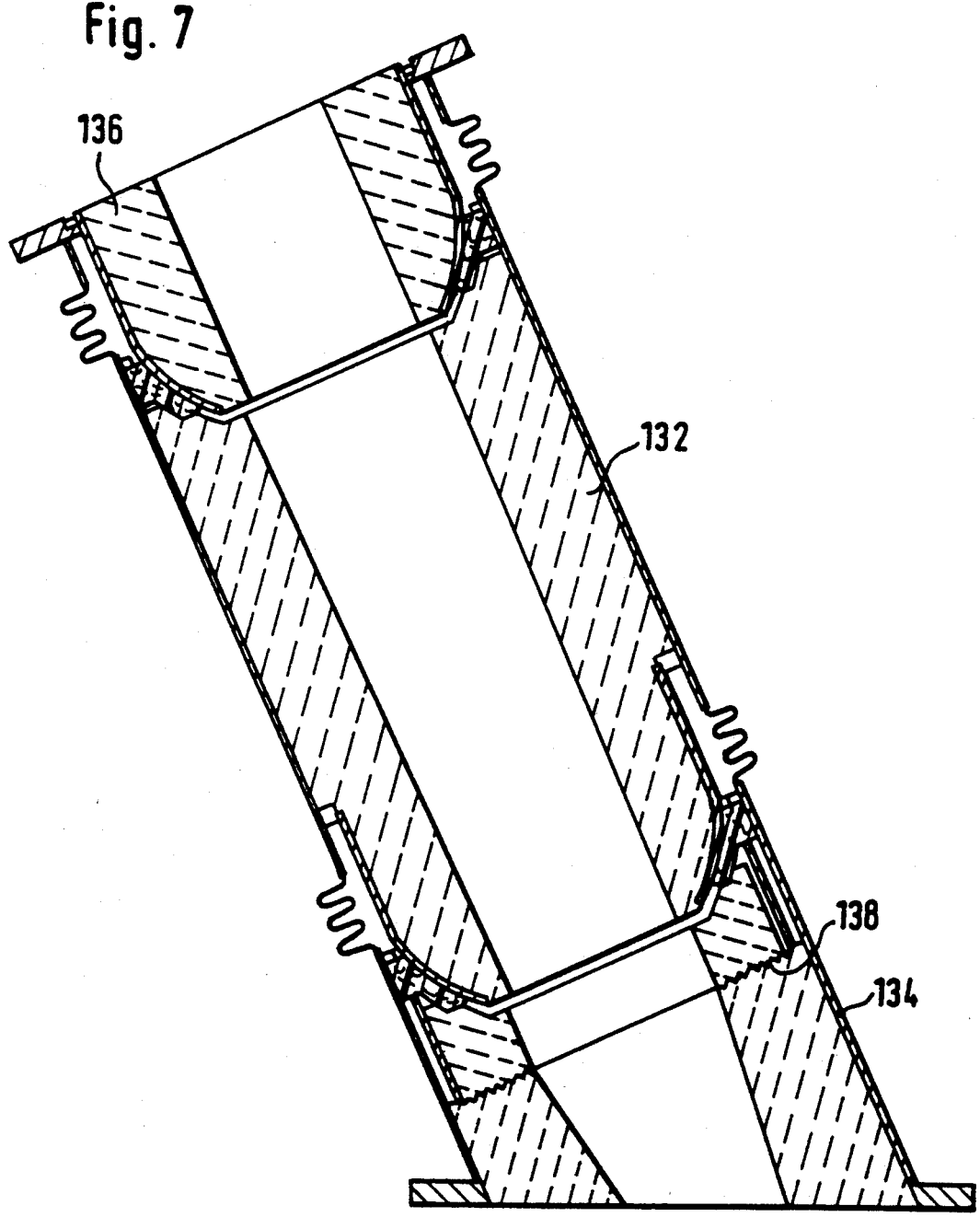
FIG. 7 is a view similar to that of FIG. 5, depicting a second embodiment of a tuyere-stock according to the present invention.
Figure 8:
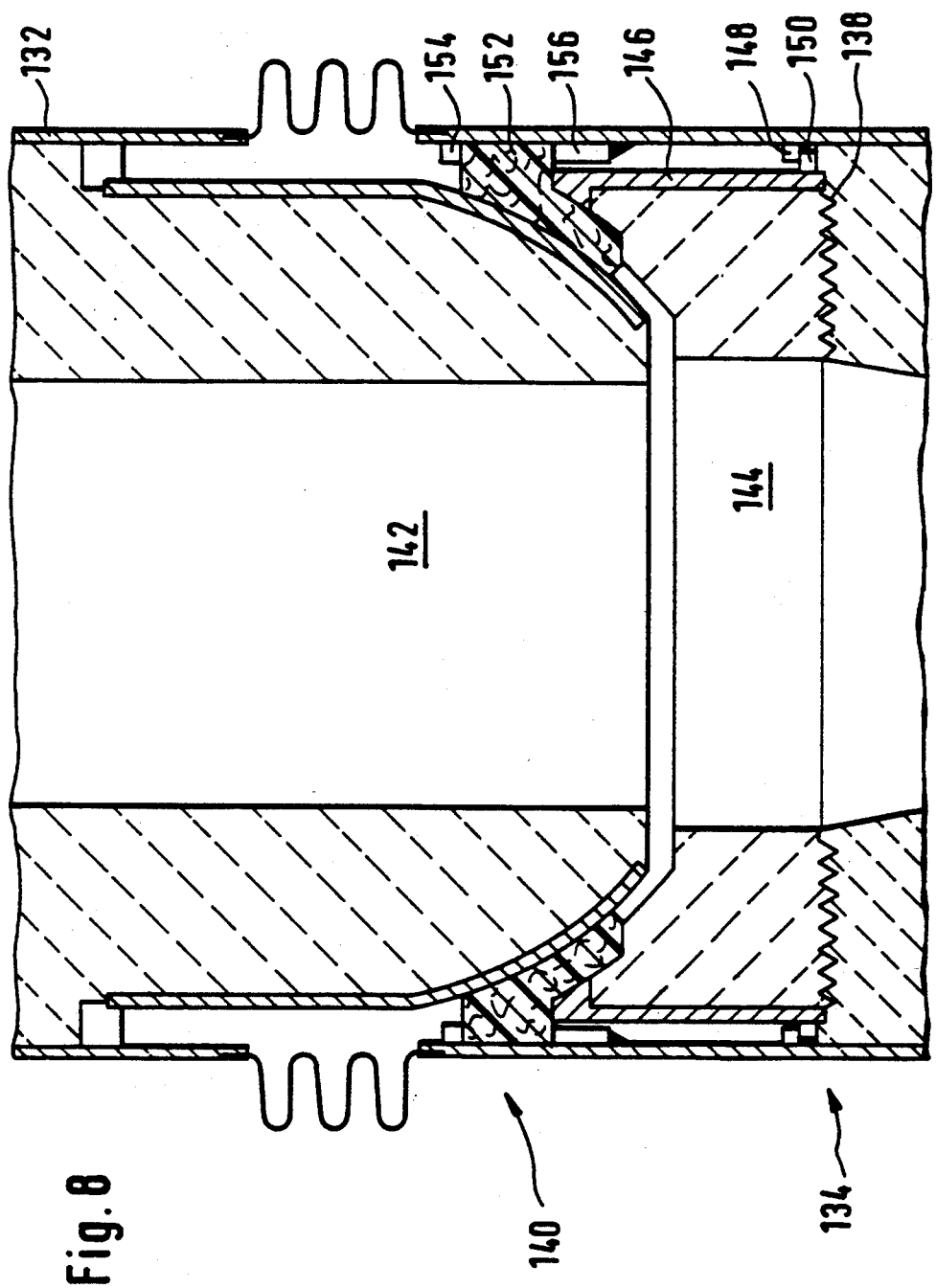
FIGS. 8, 9 and 9a illustrate different alternate embodiments of the lower joint connection of the tuyere-stock according to FIG. 7.
Figure 9:
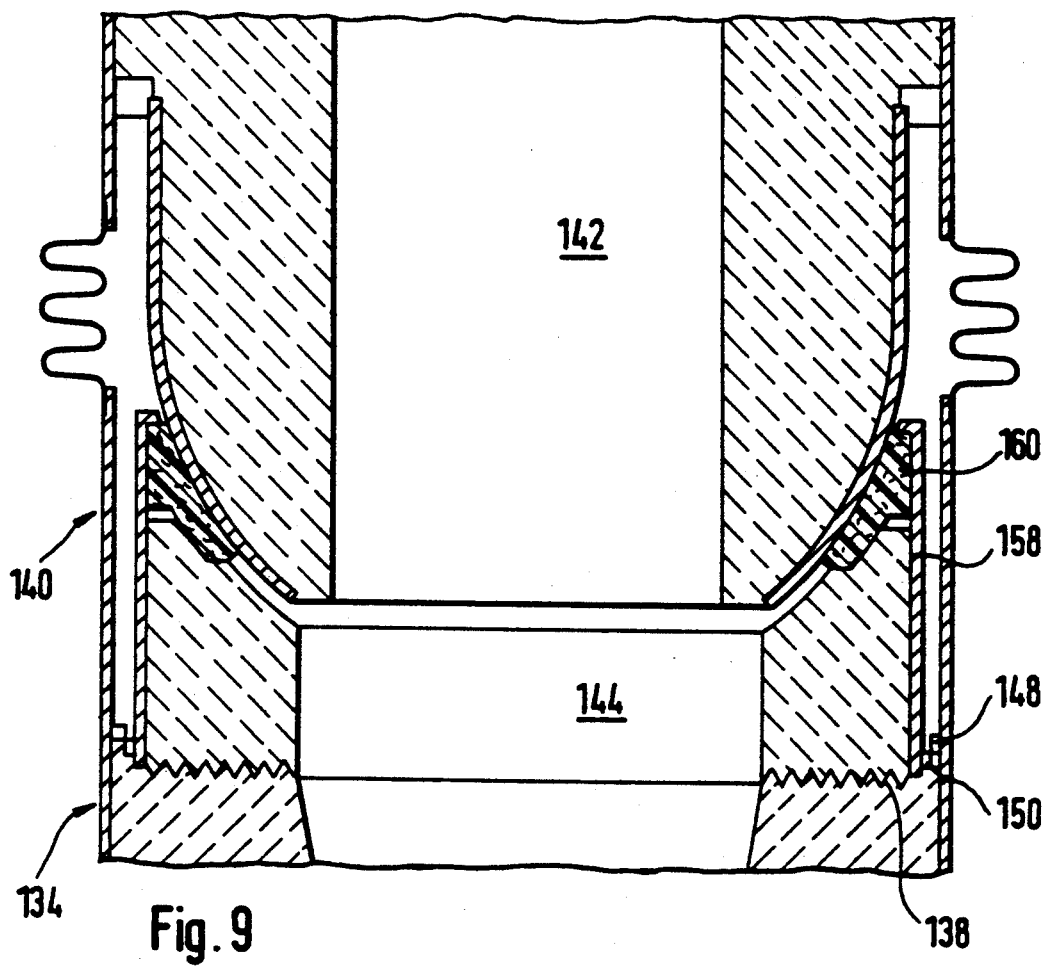

FIG. 7 shows a second embodiment of a tuyere-stock with a central tubular element 132, a lower connection piece 134 and a ball portion 136. However, unlike the embodiment of FIG. 5, the amouring of the central element 132 is connected by means of the expansion joint of the lower articulation to the amouring of the tubular connection piece 134. The flange 102 of the embodiment of FIG. 5a consequently disappears, which allows a reduction of the manufacturing costs of the tuyere-stock. On the other hand, since the tubular connection piece 134 cannot be separated from the central element 132, the manufacturing step shown in FIG. 6c is no longer feasible and other novel methods have to be employed in order to be able to cast the socket of the lower joint. To this end, the refractory of the connection piece 134 is cast, in the example shown, in two successive operations, symbolized by the interruption 138. This will also affect the design of the lower joint, in particular of the socket of the tubular connection piece 134. FIGS. 8 and 9 show several embodiments.

FIG. 8 shows the details of the ball-and-socket joint 140 between the central element 132 and the lower connection piece 134. The ball portion 142 is identical with the one of the previous embodiments, that is, provided with a refractory sheath made according to FIG. 4. On the other hand, the socket 144 the articulation 140 formed by the upper part of the refractory lining of the connection piece 134 is modified. In fact, as shown in FIG. 8, the refractory lining forming the socket 144 is cast inside the cylindrical sheath 146 made of refractory steel and fitted coaxially inside the metal amouring of the tubular connection piece 134. The sheath 146 can be held place by means of two rings 148 and 150 fixed respectively to the inner wall of the amouring and to the outer wall of the sleeve 146. The thermal insulation is obtained by means of a thick seal 152 made of ceramic fibers which is cemented to the inner surface of the amouring of the connection piece 134 and extends to the bottom between the ball portion 142 and the socket 144. Two annular supports 154 and 156, which are welded to the amouring or housing, ensure the support of the seal.

In the alternative embodiment according to FIG. 9, the socket 144 is also arranged inside a sheath 158 made of refractory steel, which compared to the embodiment of FIG. 8 is longer than the sheath 146. The part of the sheath 158 which exceeds the refractory lining, is configured as a housing for the seal 160 made of ceramic fibers. The embodiment of FIG. 9 in relation to that of FIG. 8, has the advantage that the seal 160 can be inserted together with the socket 144. On the other hand, the embodiment of FIG. 8, compared to that of FIG. 9, has the advantage of a better thermal insulation because of a seal 152 that is thicker than the seal 160.

Figure 9A:
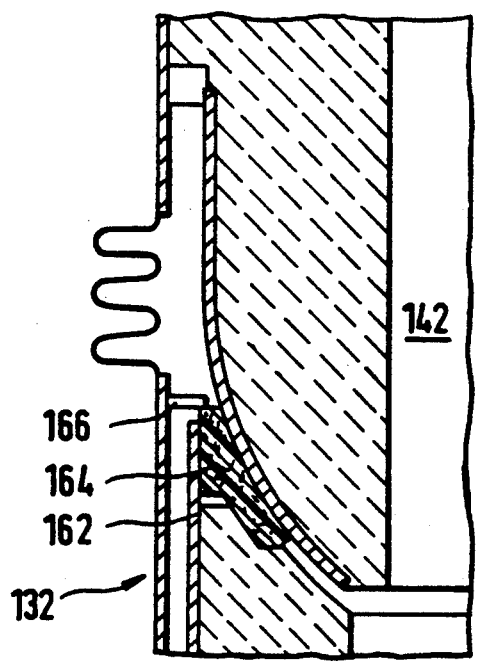

FIG. 9a shows a compromise solution between the embodiments of FIGS. 8 and 9 in that the sheath 162 is also used as a housing for the seal 164, but is associated with an annular collar 160, which is welded to the inner surface of the amouring. The seal 164 can thus also be put in place onto the socket before assembling of the tuyere-stock, as is the case in FIG. 9.

At this instant however, the intermediary step illustrated in FIG. 10b is applied. FIG. 10b shows the separated casting of the socket 144 of the lower articulation joint 140. First, the sheath 158 is placed onto a mold 168 made of wood, the housing provided for the seal 160 (FIG. 9) being directed to the bottom. The profile of the upper front of this mold 168 is complementary to that of the refractory lining of the socket 144. Next, a form 169 made of expanded synthetic material corresponding to the opening of the socket 144 is placed axially inside the sheath 158 onto the support 168, and the refractory material is cast between this form 169 and the sheath 158. Following the casting and the removal of the mold 168, the seal 60 (FIG. 9) can be cemented in its housing inside the sheath 158.

With a view to the casting of the central element 132, its metal amouring which is fixed to that of the connection piece 134 by means of the expansion joint, is overturned onto the upper flange. The casting itself of the element 132 is identical to the casting described with reference to FIG. 6b, and the same molds and forms will be used. When the casting is completed, the socket 144 (having been cast as explained with reference to FIG. 10b and after the seal has been put in place), is introduced into the amouring of the connection piece 134 in order to place it on the ball portion 142 where it is held by the abutments 148 and 150. When the socket 144 is in place a form, not shown, defining the channel of the tubular connection piece 134, is Placed on this socket 144, and the casting of the connection piece 134 is finished by filling the annular space between said form and the amouring of the tubular connection piece 134 with refractory material.

Figure 11:
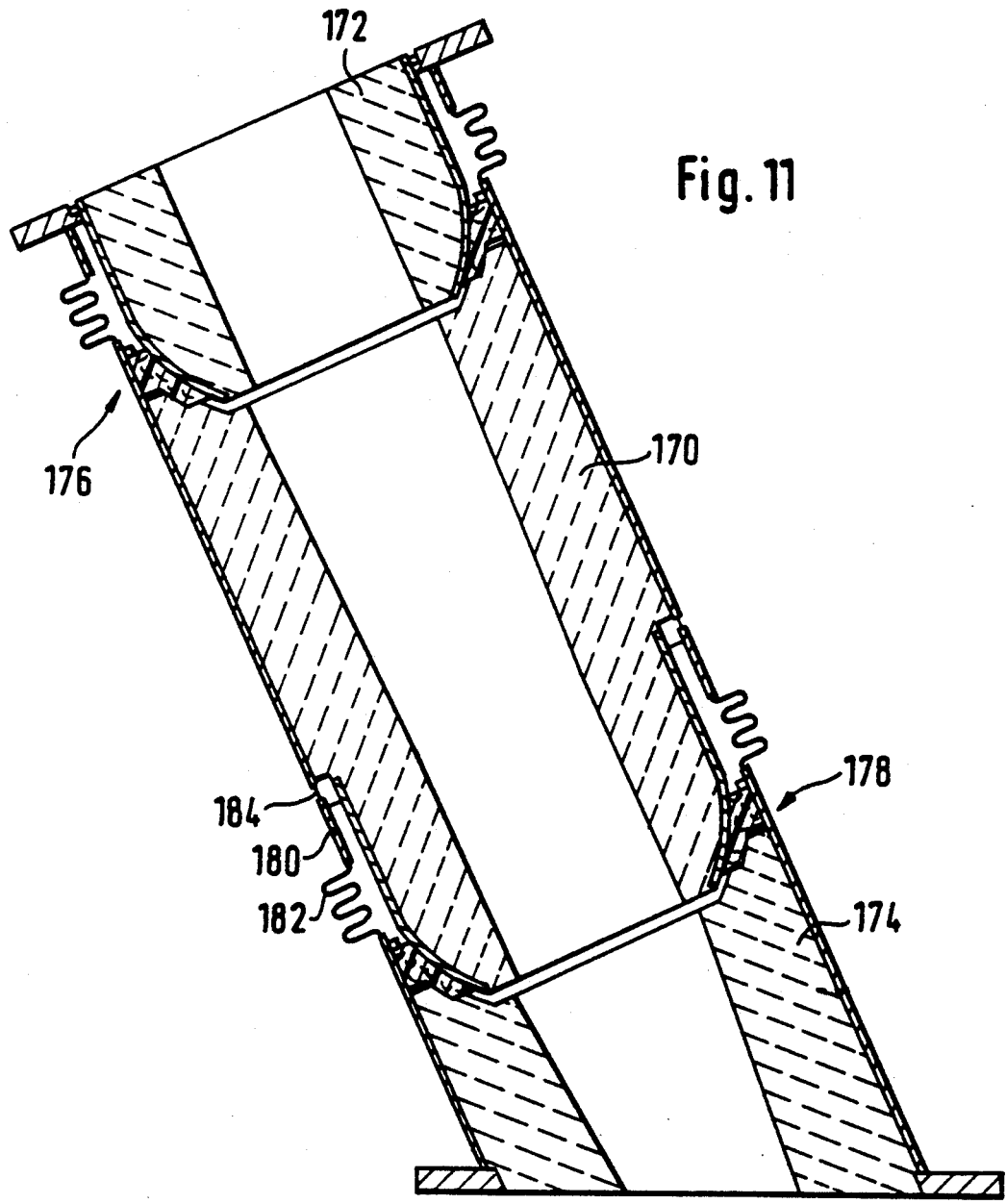
FIG. 11 illustrates schematically a third embodiment of a tuyere-stock according to the present invention.

FIG. 11 shows a third embodiment, similar to the one shown in FIG. 7, which comprises a central tubular conduit element 170 connected through an upper ball-and-socket articulation 176 to a ball portion 172 and through a lower ball-and-socket articulation 178 to a tubular connection piece 174. The lower connection piece 174 and the lower articulation 178 are identical with the embodiment of FIG. 5 and thus do not have to be described further. The central element 170 is analogous to the one of the embodiment of FIG. 7 insofar as it does not comprise a flange for its connection to the tubular connection piece 174. In order to solve (in the embodiment of FIG. 11), the manufacturing and assembly problems as explained with reference to FIG. 7, a removable or detachable link or connecting piece is provided between the amouring of the central element 170 and that of the tubular connection piece 174. As shown by FIG. 11, an upper end 180 of the expansion joint 182 is welded to the amouring of the central conduit element 170 through a metallic shoulder member 184 onto which is also welded to the sheath of the ball portion of articulation 178. The solidity of the welding of the member 180 to the shoulder 184 must be a compromise between the necessity to be able to remove the welding in case of dismounting, on the one hand, and the necessity to ensure the sealing and to restrain the internal pressure, on the the other hand.

The embodiment of FIG. 11 has the advantage of the same simplicity in manufacture as the embodiment of FIG. 5, that is, there is no need to cast the lower connection piece in two steps, and it also has the advantage of the embodiment of FIG. 7, to save the linking flange between the central element and the lower connection piece. However, the embodiment of FIG. 11 needs a welding that must resist the internal pressure.

The different casting steps of the elements of the embodiment of FIG. 11 as illustrated by FIGS. 12a, 12b and 12c, correspond exactly to those disclosed with reference to FIGS. 6a, 6b and 6c, and thus do not have to be explained further; the same forms and molds being used. The only difference lies in the absence of a flange on the connecting element 180 of the expansion joint 182 and in the absence of a flange on the central element 170, which is replaced by shoulder 184. Following the casting of the three elements 170, 172 and 174 according to FIGS. 12a, 12b and 12c, the seal of the lower articulation 178 is put in place by cementing it to the housing provided at the inner surface of the amouring of the connection piece 174 above the expansion joint 182. Then the connection piece 174 is attached to the ball portion of the central element 170 and the peripheral welding between the connecting element 180 and the shoulder 184 is made.

Figure 13:
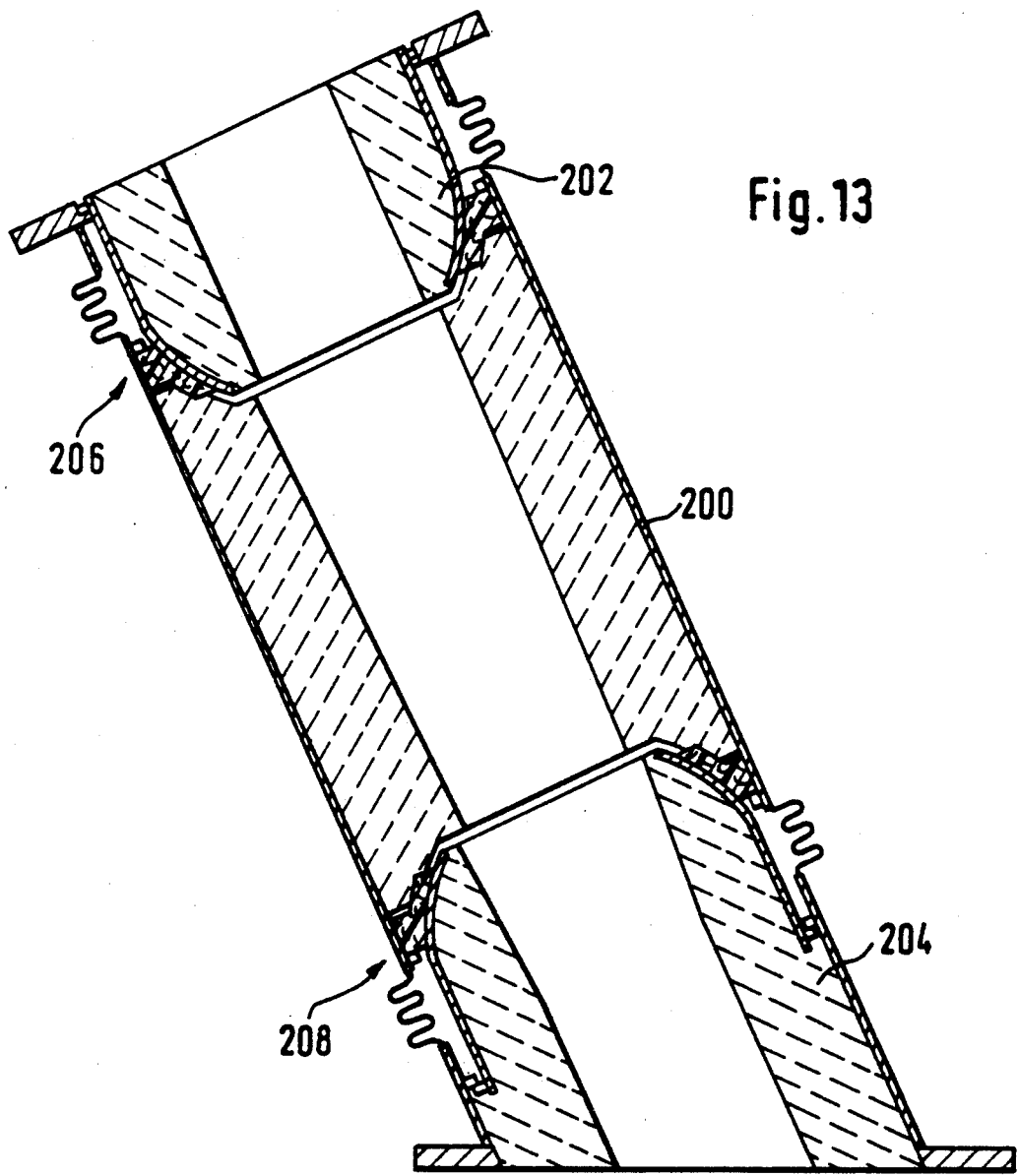
FIG. 13 illustrates schematically a fourth embodiment and a tuyere-stock according to the present invention.

With reference to FIG. 13, a fourth embodiment will not be described, which combines all the advantages of the three previous embodiments. The embodiment according to FIG. 13 also comprises a central tubular element 200 connected through an upper ball-and-socket joint 208 to a lower connection piece 204. However, contrary to the previous embodiments, the two sockets of the articulations 206 and 208 are provided at opposite ends of the central element 200, the ball portion of the lower articulation 208 forming a part of the connection piece 204. The upper and lower articulations are thus positioned in opposite directions, as disclosed in the European Patent EP-A1-0363586, which also gives the advantages described in this document.

Figure 13C:
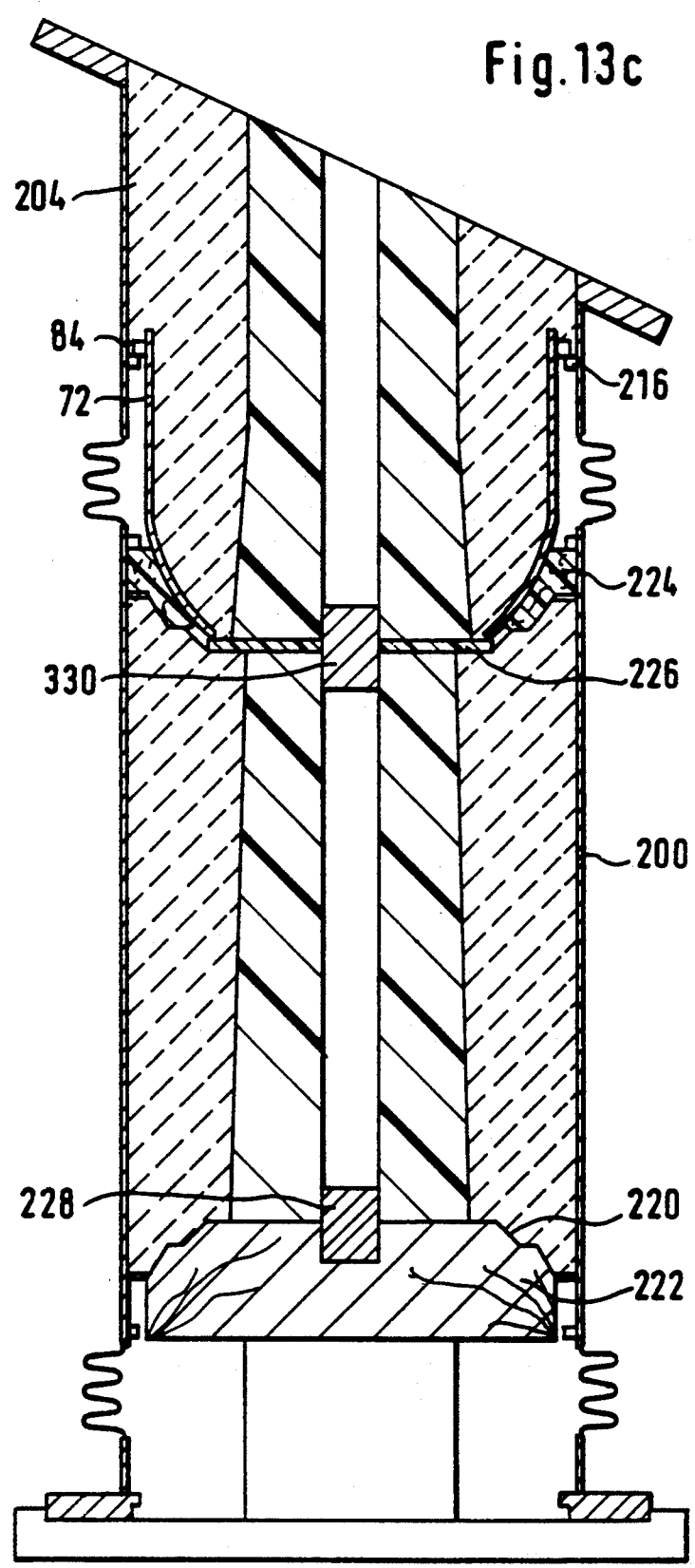

As shown in FIG. 13, this embodiment saves the flange of the central element 200, without having to provide a removable weld between the amouring of the latter and the amouring of the lower connection piece 204 and without having to cast the tubular connection piece 204 in two steps as indicated in the description hereinafter with reference to FIGS. 13a, 13b and 13c.

The manufacture of the ball portion 202 illustrated by FIG. 13a is in accordance with the manufacture of the ball portions of the previous embodiments.

FIG. 13b shows the manufacture of the central element 200. The metal amouring of the element 200, which makes part of the one of the lower tubular connection piece 204, is placed onto a mold made of wood which holds it through the housing of the seal of the lower articulation 208. The mold 210 is supported by a base 212 which is, preferably, provided with a base element supporting the amouring of the connection piece 204 through a inner stop 216 which will thereafter serve as a fixing support for the sheath of the ball portion. The profile of the upper front of the mold 210 is complementary to that of the socket of the lower articulation. Thus, a form 218 made of expanded synthetic material and corresponding to the inner channel of the central element 200, has merely to be placed axially inside the amouring of the element 200 and on the mold 210. Then the annular space between the form 218 and the amouring has to be filled to the brim of the housing of the seal of the upper articulation 206. The profile of the socket 220 of the upper articulation is formed in the cast refractory material by removing the cast material before it hardens, e.g. with a strickle having a profile complementary to the one of the socket 220. The structure thus made in accordance with FIG. 13b is then turned over and placed on a base 222 which consists preferably of a mold made of wood used to model the socket of the articulations. The structure is carried by the socket 220 on the mold 222. The seal 224 is subsequently put in place by cementing it in its housing provided to this end on the inner surface of the amouring of the element 200. A disc 226 made of expanded synthetic material is then placed at the bottom of the socket-portion previously formed by the mold 210 in FIG. 13b, the thickness of the disc corresponding to the axial width of the transverse slot of the articulation 208 between its ball-portion and socket. The sheath of ball-portion 72 is then introduced from above into the armouring of the connection piece 294 by placing it and welding it by its edge 84 onto the stop device 216 provided on the inner surface of the armouring. A form made of expanded synthetic material is then placed axially on the disc 226, the configuration of the form corresponding to the passage channel of the tubular connection piece 204. All that needs to be done then is to cast the refractory material into the annular space around that form, by using the sheath 72 as a mold. After the removal of the mold 222 and of the plugs 228 and 330 used to maintain the inner forms during the casting, the central element 200 and the tubular connection piece 204 are ready for assembly, the inner forms as well as the disc 226 can stay in place given that they will be used up automatically when the tuyere-stock is put into operation.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A device for injecting preheated air into a shaft furnace, comprising:

tubular conduit means for directing the preheated air from an outlet end of an air feeding bustle pipe to the furnace, said conduit means comprising;

at least one central tubular conduit member of a first diameter for directing the preheated air, said central tubular conduit means extending from an inlet end to an outlet end and including a steel outer sheath and a refractory inner lining;

an upstream tubular conduit member of the first diameter, extending from the outlet end of the bustle pipe to an upstream outlet end, said upstream outlet end having a profile complementary to that of the inlet end of the tubular conduit member and including a steel outer sheath and a refractory inner housing, first connector means, comprising a first ball-and-socket joint and a first expansion joint, for connecting the inlet end of the central tubular member to the upstream outlet end;

a downstream tubular conduit member of the first diameter extending from a downstream inlet end, said downstream inlet end having a profile complementary to that of the outlet end of the central tubular member, to the shaft furnace and including a steel outer sheath and a refractory inner lining;

second connector means, comprising a second ball-and-socket joint and a second expansion joint for connecting the outlet end of the central tubular member to the downstream inlet end;

said first and second ball-and-socket joints each including;

a tubular convex ball portion, formed on one of said respective ends to be connected, a tubular concave socket portion, formed on the other of said respective ends to be connected, for pivotably contacting convex ball portion; and a soft refractory annular insert interposed between the ball portion and the socket portion, wherein each of the ball portions and socket portions exhibit a radius of curvature equal to about half the diameter of the respective tubular conduit members connected by the respective ball-and-socket joints; and wherein each of the convex ball portions include a steel outer sheath and an inner refractory lining.

2. The device of claim 1, wherein the respective ball portions are formed at the upstream outlet end and the outlet end of the central tubular conduit member and the respective socket portions are formed at the inlet end of the central tubular conduit member and the downstream inlet end.

3. The device of claim 2, wherein the ball portion at the outlet end central tubular conduit member is an integral part of the central tubular conduit member.

4. The device of claim 2, wherein the ball portion of the central tubular conduit member is separated from the central tubular conduit member by a transverse junction and an interposed annular seal.

5. The device of claim 1, wherein the second connector means includes a flange connected to the expansion joint.

6. The device of claim 1, wherein the steel outer sheath of the central tubular conduit member and the steel outer sheath of the downstream tubular conduit member are directly connected each other by the second expansion joint.

7. The device of claim 2, wherein the steel outer sheath of the central tubular conduit member and the steel outer sheath of the downstream tubular conduit member are connected to each other by a detachable weld formed between the second expansion joint and a peripheral shoulder defined by one of the respective steel outer sheaths.

8. The device of claim 6, wherein the socket of the second ball-and-socket joint is formed in a first tubular connector member comprising a refractory inner lining and a steel outer sheath and the first tubular connector member is arranged coaxially within the steel outer sheath of the downstream tubular conduit member.

9. The device of claim 8, wherein a first portion of the refractory insert of the second ball and socket joint is secured to the steel outer sheath of the first tubular connector member and a second portion of the refractory insert of the second ball-and-socket joint is secured to the refractory inner lining of the first tubular connector member.

10. The device of claim 8, wherein a first portion of the refractory annular insert of the second ball-and-socket joint is secured to the steel outer sheath of the first tubular connector member and a second portion of the refractory annular insert of the second ball-and-socket joint is secured to the refractory lining of the first tubular connector member.

11. The device of claim 8, wherein the first tubular connector member further comprises a ring secured inside the steel outer sheath, wherein a first portion of the refractory seal of the second ball-and-socket is secured to the refractory inner lining of the first tubular connector member and a second portion of the refractory seal is secured to the ring of the fist tubular connector member.

12. The device of claim 1, wherein the concave socket portion of the first and second ball-and-socket joints are provided on the respective inlet and outlet ends of the central tubular conduit member and the convex ball portions are provided on the outlet end of the upstream tubular conduit member and on the inlet end of the downstream tubular conduit member, respectively.

* * * * *

UNITED STATES PATENT AND TRADEMARK OFFICE
CERTIFICATE OF CORRECTION

PATENT NO. : 5,209,657

DATED : May 11, 1993

INVENTOR(S) : Benck et al.

It is certified that error appears in the above-identified patent and that said Letters Patent is hereby corrected as shown below:

TITLE PAGE:
    Item [56], under Foreign Application Priority Data, delete "87383" and insert therefore --87838--

Col. 1, Row 47  Between "of" and "reason" insert --the ball portion, to the tip of the latter. That is the main--

Col 4, Row 53  Delete "Piece" and insert therefore --"piece--

Col. 4, Rows 65-66  Delete "of the ball-and-socket joint. A first sealing ring 62 here." and insert therefore --according to Figure 1 is, nevertheless, also feasible here.--

Col. 5, Row 3  Delete "the the" and insert therefore --the refractory of the--

Col. 5, Row 3  After "socket 60 and" insert --closes the passageway between the socket 60 and --

Col 7, Row 29  Delete "100" and insert therefore --110--

Col. 7, Row 65  Between "held" and "place" insert --in--

Col. 8, Row 38  Delete "seal 60" and insert therefore --seal 160--

Col. 8, Row 53  Delete "Placed" and insert therefore --placed--

Col. 10, Row 7  Delete "a inner" and insert therefore --an inner--

Col. 10, Row 37  Delete "294" and insert therefore --204--

UNITED STATES PATENT AND TRADEMARK OFFICE
CERTIFICATE OF CORRECTION

PATENT NO. : 5,209,657

DATED : May 11, 1993

INVENTOR(S) : Benck et al.

It is certified that error appears in the above-identified patent and that said Letters Patent is hereby corrected as shown below:

Col. 11, Row 29  Between "contacting" and "convex" insert --the--

Col. 12, Row 7  Between "connected" and "each" insert --to--

Signed and Sealed this

Fourteenth Day of February, 1995

Attest:

BRUCE LEHMAN

Attesting Officer

Commissioner of Patents and Trademarks